June 3, 1930.  H. A. LAUHOFF  1,761,132
SPRAYER FOR CAKE BODIES
Filed Dec. 17, 1924  3 Sheets-Sheet 1

Inventor
Henry H. Lauhoff,
By
Attorneys

June 3, 1930. H. A. LAUHOFF 1,761,132
SPRAYER FOR CAKE BODIES
Filed Dec. 17, 1924  3 Sheets-Sheet 2
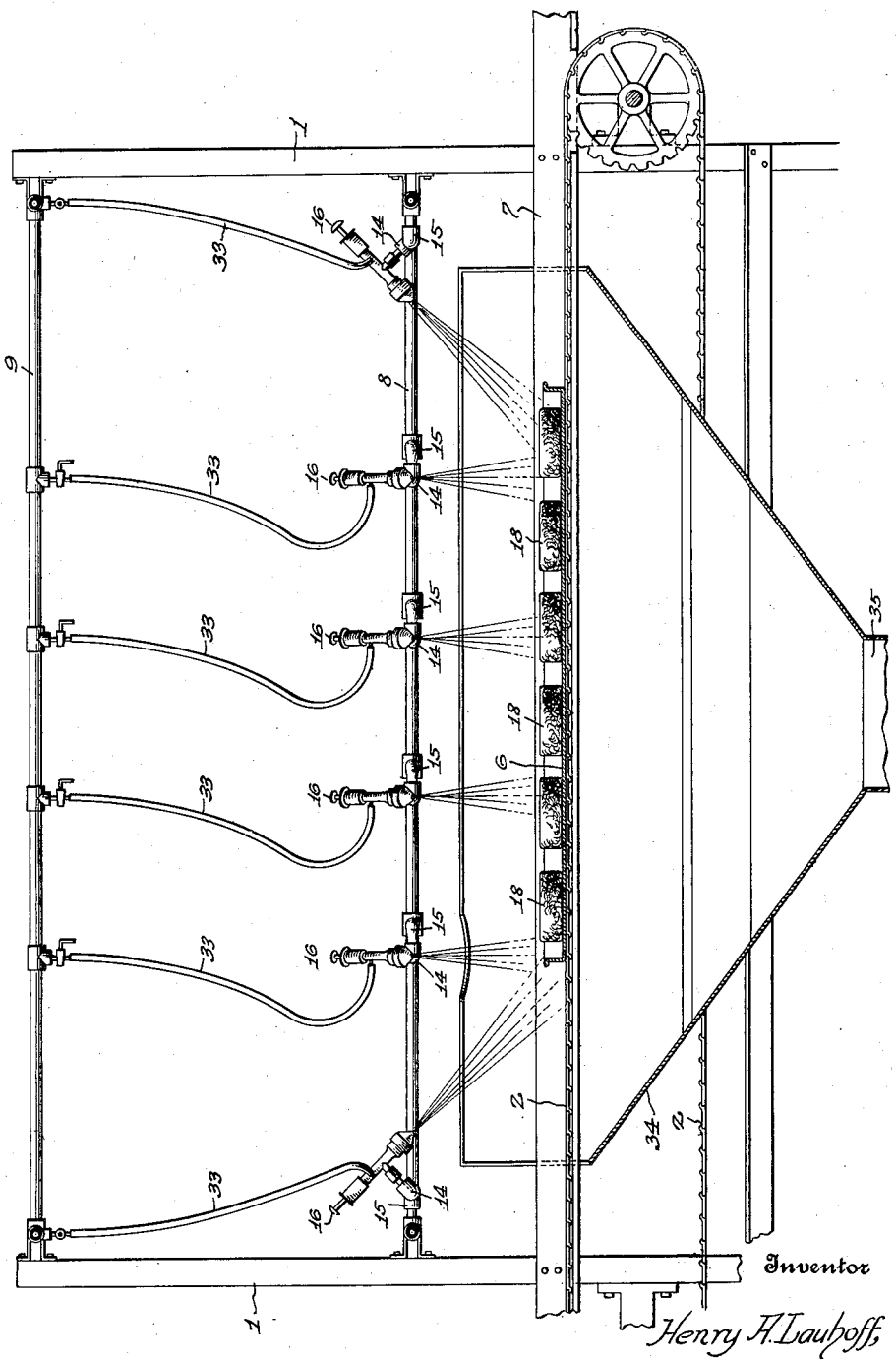
Inventor
Henry H. Lauhoff,
By
Attorneys

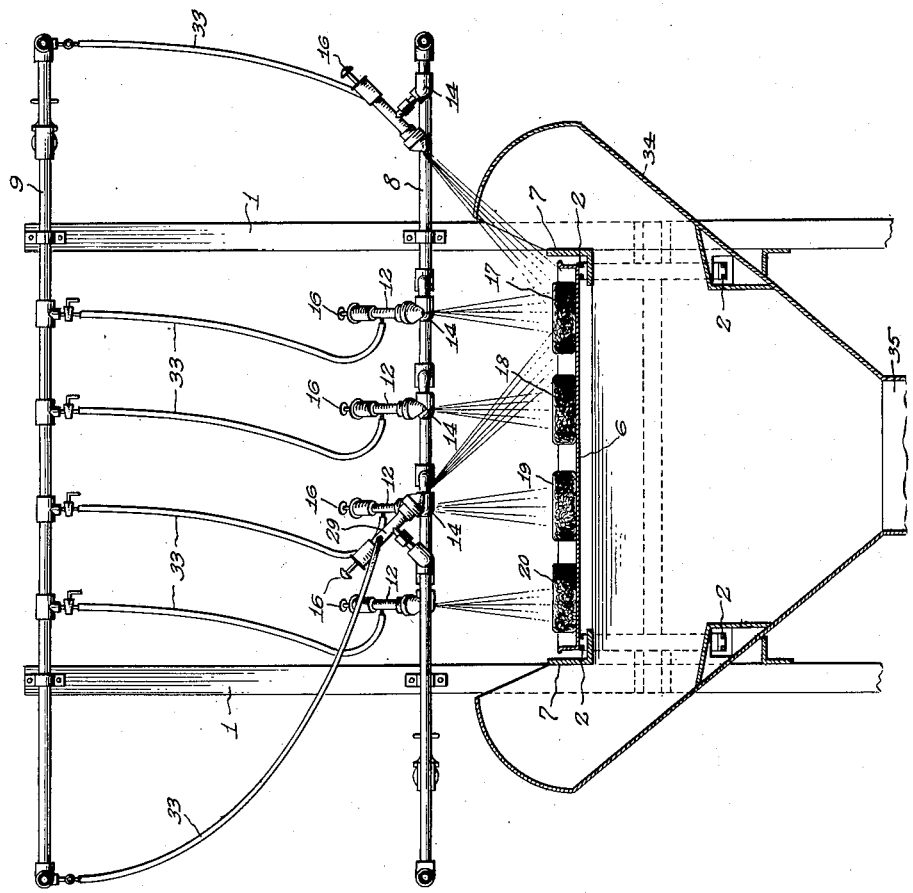

Patented June 3, 1930

1,761,132

UNITED STATES PATENT OFFICE

HENRY A. LAUHOFF, OF DETROIT, MICHIGAN

SPRAYER FOR CAKE BODIES

Application filed December 17, 1924. Serial No. 756,445.

In the manufacture of certain kinds of cakes or biscuits wherein rolled or pressed flakes, such as of cereal, are pressed into molds and subsequently baked in such molded condition, it is often desirable that after the shapes have been formed that they should be hydrated or sprayed with water or other suitable fluid in order to bring about a condition influencing the eventual condition of the cakes or biscuits when baked.

In such cakes or biscuits, it has been hitherto proposed to provide for the hydrating thereof for the purpose of effecting a partial dissolving of the soluble parts of the flakes situated about the exterior portions of the cakes whereby an adhesive or coagulating mixture results which in the baking process hardens and effects a binding together of the flakes of the cakes or biscuits and a consequent solidity and durability thereof which assists in maintaining the said cakes or biscuits in an unbroken condition when being handled and also has a material effect upon the toasting or baking of the cakes or biscuits whereby the quality and flavor of the same are improved.

It is, however, necessary that such hydrating should be effected with care as to distribution and extent of the treatment as otherwise the objects thereof may readily be defeated; too intense a treatment tending to produce a heaviness in the eventual cake or biscuit, to wash away an undesirable amount of material from the biscuit and bring about its partial integration to an undesirable extent, or to otherwise unduly saturate or disturb the flakes of the biscuit; and insufficient treatment failing to effect the required solution of the soluble parts of the exterior flakes to the required extent. It is also desirable to ensure uniformity so that in the production of large numbers of cakes or biscuits they should all receive treatment of the same extent as nearly as is practicable.

Consequently, the object of this invention is to provide means whereby the spraying of cake or biscuit bodies may be effected and controlled in a simple and efficient manner to bring about the desired results and wherein the said bodies may be progressively treated in a uniform manner with thoroughness in large quantities.

A still further object is to provide a cake spraying machine adapted for the treatment of a plurality of rows of cake bodies progressively fed through the machine, wherein provision is made for the adequate spraying of the front, rear, sides and upper surfaces of the cake bodies as they pass through the device; a still further object being to effect such spraying by the use of jets directed towards the front and the rear surfaces of the moving cake bodies, and further sprayers transversely arranged to direct spray between the rows of cake bodies and towards the sides thereof.

The invention also aims to provide in such a device for the control of the spray jets, both as to the force and volume of the spray therefrom and as to direction of the spray jets with respect to the cake bodies and with respect to one another, whereby the cake bodies may be caused to travel between downwardly converging jets of liquid as they are passed through the device.

Still further objects subsidiary to or resulting from the aforesaid objects, or from the construction or operation of the invention as it may be carried into effect, will become apparent as the said invention is hereinafter further disclosed.

In carrying the said invention into effect, I may provide in combination with a conveyor adapted to convey cake bodies arranged in rows therealong, a system of sprayers, some of which are directed downwardly at an angle to the forward surfaces of approaching cake bodies carried by the said conveyor and others similarly directed towards the rear surfaces of cake bodies receding therefrom, together with downwardly and transversely directed sprayers arranged in opposed pairs, each of said pairs being directed towards the opposite sides of a row of cake bodies passing therebetween and converging towards a point between the cake bodies of their respective rows, the said sprayers being adapted to regulation as to pressure and volume and adjustment as to direction of the jets thereof, the sprayers being mounted on a tubular frame from which they receive their fluid and being also connected with a further tubular frame constituting an air line from which air is distributed to the sprayers to assist in the spraying operation.

All of which is more particularly described and ascertained hereinafter, by way of example, having reference to the accompanying drawings, wherein Figure 1 is a plan of a cake spraying machine embodying the said invention;

Figure 2 is a longitudinal vertical section of the same; and

Figure 3 is a transverse section of the same, taken on the line 3x—3x, Figure 1.

Similar characters of reference indicate similar parts in the several figures of the drawings.

Figure 1:
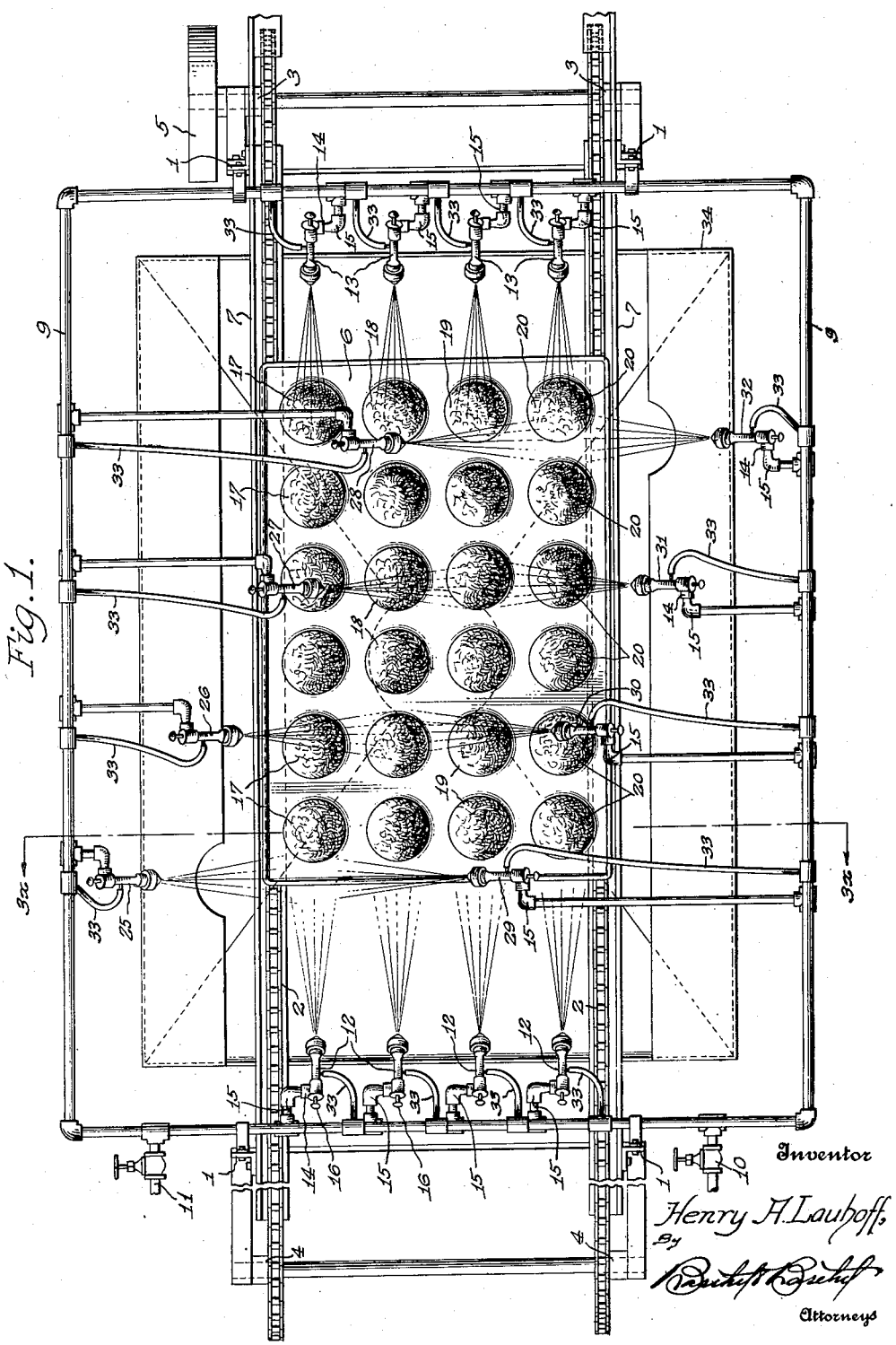

Mounted within a structure 1 is a conveyor comprising a pair of chains 2 mounted on sprockets 3 and 4 and adapted to be driven through the medium of the driving pulley 5, the said conveyor being adapted to progressively carry a number of suitable trays through a machine, one of which trays is shown and indicated by the reference numeral 6. 7 are laterally disposed guides preventing displacement of the trays in their travel through the machine.

Also mounted in the said structure 1 are rectangular tubular frames 8 and 9, the former being provided with a valved inlet 10 for the admission of water or other liquid thereto and the latter with a valved inlet 11 for the admission of air thereto; and mounted upon the opposite end members of the said frame 8 are sprayers or atomizers 12 and 13 hingedly connected at 14 to suitable connections 15 through which the said sprayers receive liquid from the said frame 8; 16 being the controls whereby the passage of liquid through the sprayers is regulated in the manner well known in connection with such sprayers and not therefore illustrated in detail in the drawings.

The biscuit bodies are arranged upon the tray in rows 17, 18, 19 and 20 longitudinally thereof, and the sprayers 12 are directed downwardly at an angle to the front faces of the biscuit bodies of the several rows, so that they will impinge on such front faces of each biscuit body and upon the upper surfaces thereof progressively as the tray passes through the machine, the sprayers 13 being similarly directed towards the receding faces of the biscuit bodies in each row with respect to which each of the said sprayers is associated.

The side members of the frame 8 also serve to support and supply sprayers 25, 26, 27, 28, 29, 30, 31 and 32, situated at varying distances from the said frame and inwardly therefrom, said sprayers being directed inwardly and downwardly of the machine and the sprayers 25 and 29 forming a pair directed against opposite sides of the row of cake bodies 17, the pair 26 and 30 against the opposite sides of rows 18, the pair 27 and 31 against opposite sides of rows 19, and the pair 28 and 32 against opposite sides of the row 20 as will be readily apparent from an examination of Figure 1 of the drawings, the jets of each pair converging towards and impinging against each other whereby a cloud of spray is formed around the biscuits and the arrangement of jets referred to effectively providing for the spraying of all of the cake bodies passing through the machine from four sides and towards the upper surfaces thereof, the spraying of the sides or edges of the said cake bodies being particularly well taken care of, which is regarded as being an important feature of the invention.

The type of cake bodies for the treatment of which the invention is essentially intended comprise flakes of cereal or similar material having individually a more or less flat formation and arranged in approximately horizontal layers in the cake body whereby the edges of the said cake body will disclose the edges of the outer arrangement of flakes comprising the said body; and by the spraying of such a body with a device of the type suggested and in the manner described, liquid or moisture is driven in between the layers of the flakes forming the outer portions of the biscuit, is partially absorbed by the said flakes and partially dissolves soluble portions thereof, whereby a paste or adhesive mixture is produced in and about the outer portions of the cake body which in the subsequent baking process effects a binding together of the said flakes and a consequent stability in the baked biscuit which ordinarily would otherwise be lacking.

In sprayers of the type illustrated, it is usual to employ air under pressure to assist in the atomizing, this being applied in the present instance from the tubular frame 9 to the sprayers by means of flexible tubes 33. 34 is an exhaust casing which extends around the medial portion of the conveyor and has an outlet 35 which may be connected with any suitable exhausting means (not shown) for the purpose of drawing off vapor or moisture laden air from around the biscuit bodies as they are sprayed, as otherwise such moisture would rapidly collect in the trays and on the sprayers forming drops of water which if permitted to fall on to the biscuits would result in the formation of hard and white spots on the biscuits which are undesirable; and furthermore, a heavy moisture laden atmosphere about the machine would be objectionable as tending to produce a sodden effect in the biscuit bodies, and by reason of the drawing off of such moisture through the exhaust casing 34 the presence of such an atmosphere and the formation of drops on the sprayers is greatly minimized.

The connections by means of which the said sprayers are mounted are of a hinged or flexible nature, and it will be obvious that the said sprayers may be angularly adjusted in order that the direction of the jets therefrom may be varied to suit the nature, size or disposition of the biscuit bodies being passed through the machine, the volume or pressure of the jets being also capable of regulation in the manner common to pressure sprayers.

The device described may be quite cheaply constructed and is very effective in obtaining the required results, the use thereof in connection with the manufacture of flake cakes or biscuits being attended with a marked improvement in the quality and stability of the eventual cake or biscuit product; and it will be readily understood that the liquid employed in the sprayers may not necessarily be water or water alone, as it may be any other fluid which may be regarded as necessary or desirable for the saturation or partial saturation of the cakes or biscuits or water flavored or containg any other material such as sugar, salt or starch which may be of benefit in securing any desired flavor or condition in the cakes or biscuits sprayed in the manner suggested.

This invention may be developed within the scope of the following claims without departing from the essential features of the said invention, and it is desired that the specification and drawings be read as merely illustrative and not in a limiting sense, except as necessitated by the prior art.

What I claim is:—

1. In a device of the class described, a conveyor adapted to carry rows of cake bodies, sprayers arranged in pairs over said conveyor, the members of each pair being disposed opposite to each other and at opposite sides of the directional axis of the conveyor, the lines of projection from the sprayers of the several pairs intersecting on the conveyor at points spaced transversely and longitudinally with respect to the line of travel of said conveyor.

2. In a device of the class described, a conveyor adapted for the progressive passage of cake bodies thereover, sprayers arranged in opposition to each row of said cake bodies as they pass over said conveyor, further sprayers directed against the rear surfaces of said cake bodies during their movement, and still further sprayers having impinging jets forming a moisture laden cloud about said cake bodies, said last mentioned sprayers being arranged in oppositely disposed pairs, each pair being arranged relative to a separate row of said cake bodies.

In testimony whereof I affix my signature.

HENRY A. LAUHOFF.